March 7, 1967

C. R. CARLSON 3,307,590

PIPE INSULATION

Filed Oct. 15, 1963

INVENTOR
Charles R. Carlson
his attorneys

United States Patent Office 3,307,590
Patented Mar. 7, 1967

3,307,590
PIPE INSULATION
Charles R. Carlson, P.O. Box 61,
Jamestown, N.Y. 14701
Filed Oct. 15, 1963, Ser. No. 316,362
4 Claims. (Cl. 138—149)

This invention relates to pipe insulation and particularly to a method of forming pipe insulation in situ and to the resultant product. The use of split preforms of insulating material and of insulating wrappings on pipe is quite old and the desirability of insulating pipe against the surrounding atmosphere has long been recognized. The prior art practices have, however, been time consuming in application and have not provided the desirable continuity of protection against heat transfer as well as the needed protection of the insulant against physical damage. For example, split members of cellular asbestos or foamed insulants when applied to pipes require metal straps or bands at intervals to hold them in place yet every joint is potentially, if not actually, open from the pipe to the atmosphere. Additionally, the surfaces of such insulants are unprotected and readily subject to physical damage from accidental blows, abrasion and the like.

I provide a pipe insulation which overcomes these problems of the prior art. The insulation of my invention eliminates all breaks in the system and provides a surface resistant to physical damage. Preferably, the insulation of my invention comprises a spaced shell resistant to physical damage surrounding the pipe to be protected, means between the pipe and shell centering the shell about the pipe and a foamed insulant formed within the shell and adhering to the pipe, the shell and the centering means to form a unitary whole. Preferably, the shell is in two pieces of light weight metal such as aluminum and frictionally engaging one with the other to form a spaced member. The centering means are preferably preformed urethane blocks and the foam insulant is urethane foam formed by reacting urethane reaction mix within the placed shell.

In the foregoing general description I have described certain problems of the prior art and certain advantages, objects and purposes of my invention. Other objects, advantages and purposes of this invention will become apparent from a consideration of the following description and the accompanying drawings in which FIGURE 1 is an isometric view of a preferred form of my invention applied to straight pipe; and FIGURE 2 is an isometric view of a preferred form of my invention applied to a bend of pipe.

Figure 1:
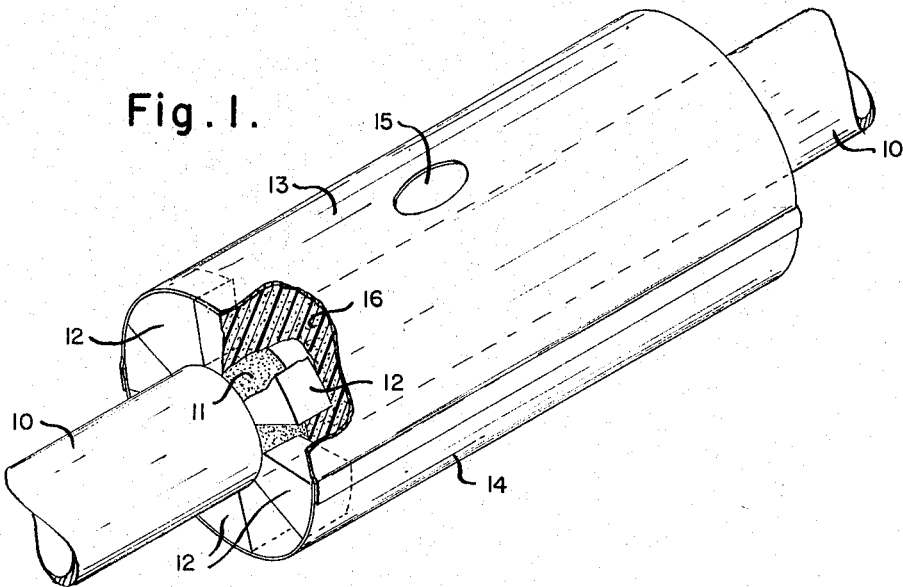

Referring to the drawings, I have illustrated in FIGURE 1 a straight run of pipe 10 to which is applied spaced strips of tape 11 having pressure sensitive adhesive on both sides. To the tape are attached spaced radial blocks 12 of foamed preformed urethane. A cylindrical shell made up of two half cylinders 13 and 14 of aluminum adapted to frictionally engage along their edges is placed over the spaced radial blocks 12. An opening 15 is provided in one of said half cylinders. A urethane reaction mix is poured into the cylinder formed by the aluminum shells where it reacts to form foamed urethane 16 which attaches itself during the reaction to the inner walls of the aluminum shell, to the outer wall of the pipe 10 and to the urethane blocks. At the same time the urethane attaches itself to the next adjacent formed section of urethane to form a continuous insulating member over the entire pipe surface.

Figure 2:
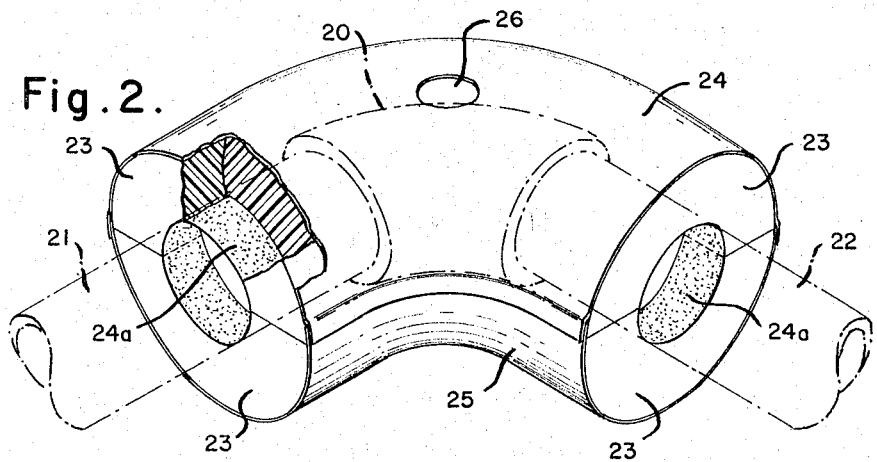

In FIGURE 2 I have illustrated a pipe elbow 20 with connecting pipes 21 and 22. Semi-circular members 23 of preformed foamed urethane are placed around the pipe section 21 and 22 by means of pressure sensitive tape 24a similar to the attachment of the blocks 12 of FIGURE 1. Around the members 23 are placed preformed aluminum shell segments 24 and 25 frictionally engaging each other to hold themselves in place. A urethane reaction mix is poured through an opening 26 in one of shells 24 or 25 to form a foamed urethane in situ which attaches itself to the pipe, the shell and the spacers to form a unitary insulant.

In the foregoing description and the accompanying drawing, I have illustrated and described a present preferred embodiment and practice of my invention. It will, however, be understood that this invention may be otherwise embodied within the scope of the following claims.

I claim:

1. A pipe insulation in the form of an integral unit comprising a thin shell of relatively tough abrasion resistant material spaced from the pipe to be protected, spaced insulating spacers of preformed foamed insulant between the pipe and shell holding the shell in position about the pipe to be protected and a foam insulant foamed between the pipe and shell filling the shell and self adhering to the shell and to the insulating spacers to form a continuous unitary mass.

2. A pipe insulation in the form of an integral unit comprising a thin shell of aluminum spaced from the pipe to be protected, spaced insulating spacers of preformed urethane foam between the pipe and shell holding the outer shell in position about the pipe to be protected and foamed urethane foamed between the pipe and shell filling the shell and self adhering to the shell and to the insulating spacers to form a continuous unitary mass.

3. A pipe insulation in the form of an integral unit comprising a thin shell of sheet metal spaced from the pipe to be protected, spaced insulating spacers of preformed urethane foam between the pipe and shell holding the shell in position about the pipe to be protected and a foamed insulant foamed between the pipe and shell filling the shell and adhering to the shell and to the insulating spacers to form a continuous unitary mass.

4. A pipe insulation in the form of an integral unit comprising a preformed thin shell of fiberglass spaced from the pipe to be protected, spaced insulating spacers of preformed urethane foam between the pipe and shell holding the shell in position about the pipe to be protected and foamed urethane foamed between the pipe and shell filling the shell and self adhering to the shell and to the insulating spacers to form a continuous unitary mass.

References Cited by the Examiner

UNITED STATES PATENTS

| | | | |
|---|---|---|---|
| 2,545,030 | 3/1951 | Isenberg et al. | 138—149 X |
| 2,650,180 | 8/1953 | Walker | 138—149 X |
| 2,857,931 | 10/1958 | Lawton | 138—149 X |
| 2,930,407 | 3/1960 | Conley | 138—149 X |
| 2,962,051 | 11/1960 | Burkes | 138—149 |

LAVERNE D. GEIGER, *Primary Examiner.*

LOUIS LENNY, *Examiner.*

T. MOORHEAD, *Assistant Examiner.*